US005666720A

United States Patent [19]

Smith

[11] Patent Number: 5,666,720

[45] Date of Patent: Sep. 16, 1997

[54] APPARATUS FOR STUFFING A SNAILED ENDLESS PRE-INKED RIBBON INTO A RIBBON CARTRIDGE

[76] Inventor: Larry Smith, 1705 8th Ave. East, Kalispell, Mont. 59901

[21] Appl. No.: 494,699

[22] Filed: Jun. 26, 1995

[51] Int. Cl.$^6$ ........................ B23P 19/00

[52] U.S. Cl. ........................ 29/806; 53/520

[58] Field of Search ........................ 29/806, 714; 53/520, 53/522

[56] References Cited

U.S. PATENT DOCUMENTS

| | | | |
|---|---|---|---|
| 4,609,422 | 9/1986 | Becking | 269/37 |
| 5,136,778 | 8/1992 | Bell et al. | 29/806 |

*Primary Examiner*—P. W. Echols
*Assistant Examiner*—Adrian L. Coley

[57] ABSTRACT

An apparatus for stuffing a snailed endless new pre-inked ribbon into a ribbon cartridge is provided, said apparatus comprising a cabinet having a top plate mounted thereon, a ribbon stock reel assembly mounted on the top plate for supporting a new pre-inked ribbon supply reel containing a length of new pre-inked ribbon, a ribbon stock reel brake assembly mounted in the cabinet and attached to the ribbon stock reel assembly, an idler with an adjustable collar for providing tension on the new pre-inked ribbon between the new pre-inked ribbon supply reel on the ribbon stock reel assembly and a counting wheel, a counting wheel, a proximity sensor, an electrical motor for pulling the new pre-inked ribbon from the ribbon stock reel assembly past the idler around the counting wheel and stuffing said new pre-inked ribbon into a ribbon cartridge, a universal jig having cartridge securing means for holding the ribbon cartridge to be stuffed mounted on the top plate, a programmed counter, a control panel having a main power switch, main power indicator, a main power fuse, a reset switch, an electrical motor control which has an electrical motor off-on/speed control, an electrical motor power indicator, an electrical motor direction switch, and an electrical motor power fuse and the wiring necessary to interconnect the various electronic components.

7 Claims, 4 Drawing Sheets

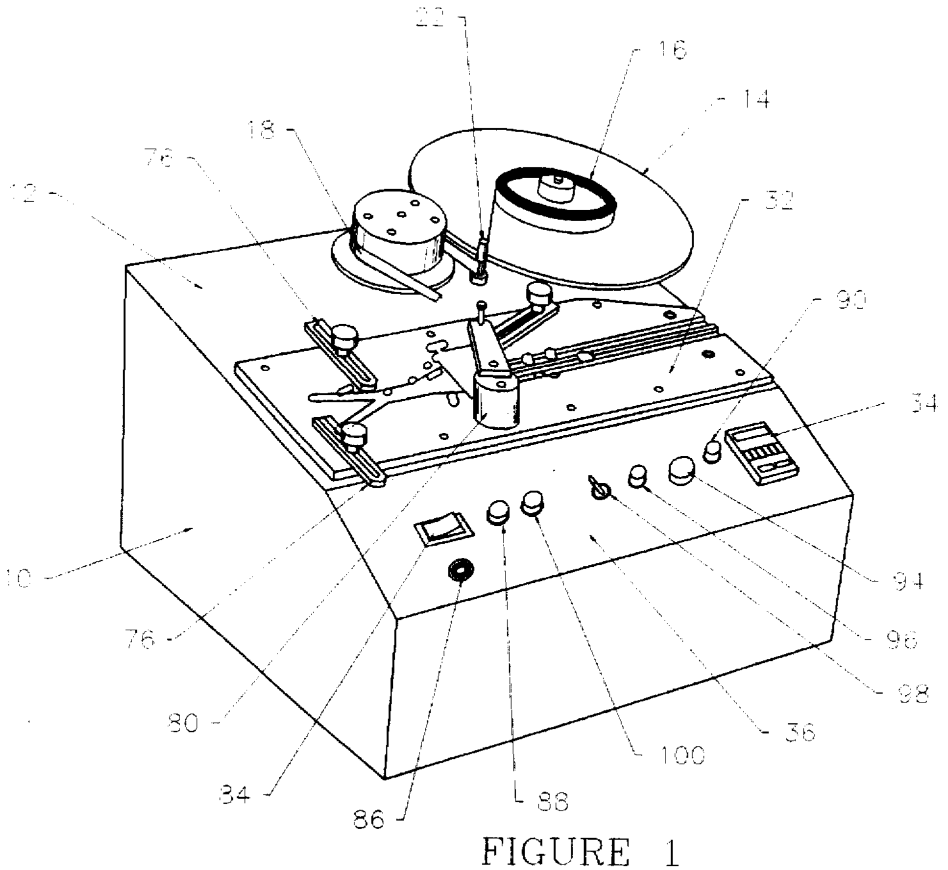
FIGURE 1
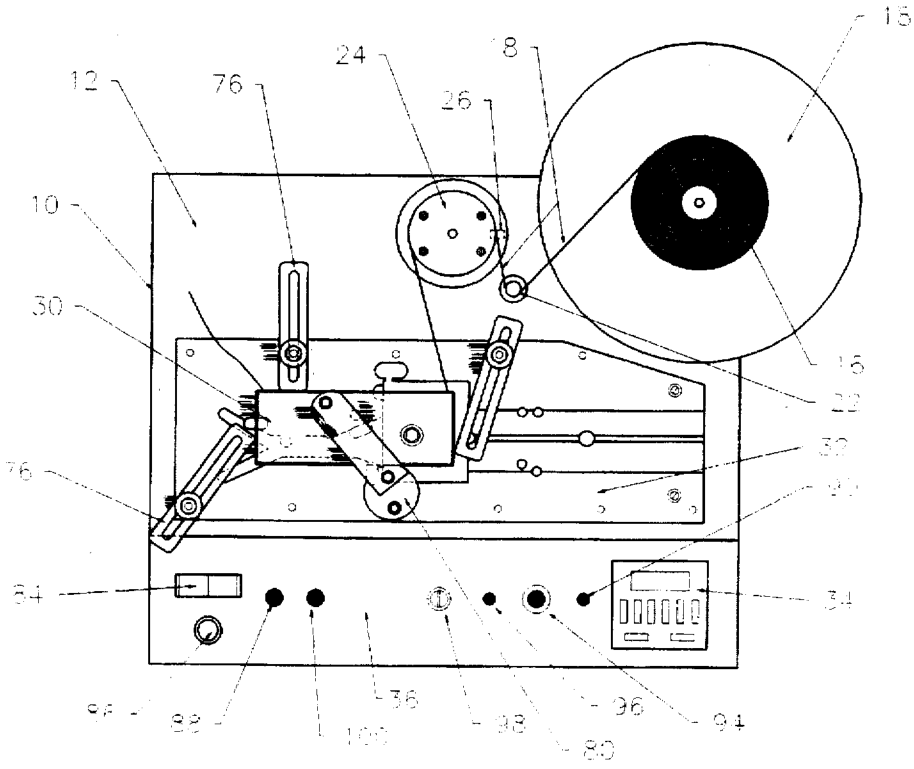
FIGURE

APPARATUS FOR STUFFING A SNAILED ENDLESS PRE-INKED RIBBON INTO A RIBBON CARTRIDGE

BACKGROUND OF THE INVENTION

The present invention relates to ribbon cartridges containing an endless loop of inked ribbon, and more particularly to an apparatus for stuffing a snailed endless new pre-inked ribbon into a ribbon cartridge.

With the advent of increased computer usage also comes increased computer printer usage. A great number of computer printers and other office equipment utilize ribbon cartridges to transfer electronic signals to paper to provide hard copy. Ribbon cartridges may utilize a snailed pre-inked ribbon stuffed therein.

With usage, the snailed pre-inked ribbon stuffed into a ribbon cartridge loses the ability to provide hard copy and must be replaced either by replacing the ribbon cartridge or replacing the snailed pre-inked ribbon stuffed into a ribbon cartridge. In a process known as "restuffing", a ribbon cartridge containing snailed pre-inked ribbon which has lost the ability to provide hard copy is recycled by removing the spent snailed pre-inked ribbon and restuffing the ribbon cartridge with new pre-inked ribbon. New pre-inked ribbon is commercially available as being manufactured, inked and spooled onto large reels.

Various apparatus and methods are used to stuff a new pre-inked ribbon into a ribbon cartridge yet none utilize an apparatus for stuffing a snailed endless new pre-inked ribbon into a ribbon cartridge comprising a cabinet having a top plate mounted thereon, a ribbon stock reel assembly mounted on the top plate for supporting a new pre-inked ribbon supply reel containing a length of new pre-inked ribbon, a ribbon stock reel brake assembly mounted in the cabinet and attached to the ribbon stock reel assembly, an idler with an adjustable collar for providing tension on the new pre-inked ribbon between the new pre-inked ribbon supply reel on the ribbon stock reel assembly and a counting wheel, a counting wheel, a proximity sensor, an electrical motor for pulling the new pre-inked ribbon from the ribbon stock reel assembly past the idler around the counting wheel and stuffing said new pre-inked ribbon into a ribbon cartridge, a universal jig having cartridge securing means for holding the ribbon cartridge to be stuffed mounted on the top plate, a programmed counter, a control panel having a main power switch, main power indicator, a main power fuse, a reset switch, an electrical motor control which has an electrical motor off-on/speed control, an electrical motor power indicator, an electrical motor direction switch, and an electrical motor power fuse and the wiring necessary to interconnect the various electronic components. The apparatus of the present invention utilizes a separate splicing means for splicing the ends of the new pre-inked ribbon and providing the final product of a ribbon cartridge containing the stuffed new snailed pre-inked ribbon.

SUMMARY OF THE INVENTION

It is the object of the present invention to provide, and accordingly, there is provided herein, an apparatus for stuffing a snailed endless new pre-inked ribbon into a ribbon cartridge which apparatus is safe, inexpensive, easy to use, portable and configured and constructed to improve the overall efficiency of the ribbon cartridge stuffing process by simplifying operator interaction with the apparatus and by improving the reliability of the components of the apparatus.

The apparatus for stuffing a snailed endless new pre-inked ribbon into a ribbon cartridge provided herein comprises a cabinet having a top plate mounted thereon, a ribbon stock reel assembly mounted on the top plate for supporting a new pre-inked ribbon supply reel containing a length of new pre-inked ribbon, a ribbon stock reel brake assembly mounted in the cabinet and attached to the ribbon stock reel assembly, an idler with an adjustable collar for providing tension on the new pre-inked ribbon between the new pre-inked ribbon supply reel on the ribbon stock reel assembly and a counting wheel, a counting wheel, a proximity sensor, an electrical motor for pulling the new pre-inked ribbon from the ribbon stock reel assembly past the idler around the counting wheel and stuffing said new pre-inked ribbon into a ribbon cartridge, a universal jig having cartridge securing means for holding the ribbon cartridge to be stuffed mounted on the top plate, a programmed counter, a control panel having a main power switch, main power indicator, a main power fuse, a reset switch, an electrical motor control which has an electrical motor off-on/speed control, an electrical motor power indicator, an electrical motor direction switch, and an electrical motor power fuse and the wiring necessary to interconnect the various electronic components. The apparatus of the present invention utilizes a separate splicing means for splicing the ends of the new pre-inked ribbon and providing a final product of the ribbon cartridge containing the stuffed snailed new pre-inked ribbon.

BRIEF DESCRIPTION OF THE DRAWINGS

FIG. 1 is a perspective view of an apparatus for stuffing a snailed endless pre-inked ribbon into a ribbon cartridge embodying the present invention.

FIG. 2 is a top view of an apparatus for stuffing a snailed endless pre-inked ribbon into a ribbon cartridge embodying the present invention showing a ribbon cartridge attached thereto.

DESCRIPTION OF THE PREFERRED EMBODIMENT

Figure 3:
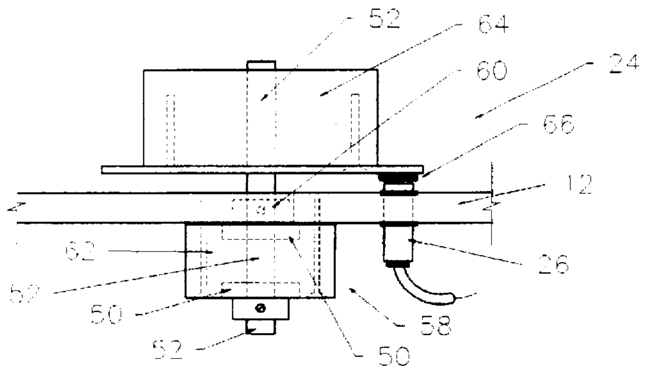
FIG. 3 is an enlarged side view of a counting wheel having a sensing indicator and a proximity sensor of an apparatus for stuffing a snailed endless pre-inked ribbon into a ribbon cartridge embodying the present invention.

Reference now should be made to the drawings in which the same reference numbers are used throughout the various figures to designate the same components.

Referring now to FIGS. 1 and 2, the present invention, an apparatus for stuffing a snailed endless new pre-inked ribbon 18 into a ribbon cartridge 30 is depicted in perspective view. More particularly, the apparatus for stuffing a snailed endless new pre-inked ribbon 18 into a ribbon cartridge 30 comprises a cabinet 10 having a top plate 12 mounted thereon, a ribbon stock reel assembly 14 mounted on the top plate 12 for supporting a new pre-inked ribbon supply reel 16 containing a length of new pre-inked ribbon 18, a ribbon stock reel brake 20 mounted in the cabinet 10 and attached to the ribbon stock reel assembly 14, an idler 22 with an adjustable idler collar 46 for providing tension on the new pre-inked ribbon 18 between the new pre-inked ribbon supply reel 16 on the ribbon stock reel assembly 14 and a counting wheel 24, a counting wheel 24, a proximity sensor 26, an electrical motor 28 for pulling the new pre-inked ribbon 18 from the ribbon stock reel assembly 14 past the idler 22 around the counting wheel 24 and stuffing said new pre-inked ribbon 1.8 into a ribbon cart-ridge 30, a universal jig 32 having cartridge securing means 76 for holding the ribbon cartridge 30 to be stuffed mounted on the top plate 12, a programmed counter 34 mounted on a control panel 36, a control panel 36 having a main power switch 84, main power indicator 86, a main power fuse 88, a reset switch 90, an electrical motor control which has an electrical motor off-on/speed control 94, an electrical motor power indicator 96, an electrical motor direction switch 98, the programmed counter 34, and an electrical motor power fuse 100 and the wiring necessary to interconnect the various electronic components.

The apparatus for stuffing a snailed endless new pre-inked ribbon 18 into a ribbon cartridge 30 has a cabinet 10. The cabinet 10 comprises an enclosed and generally box shaped enclosure having length and width dimensions as well as front, right side, left side, and rear elevations, and a top, with such front, right side, left side, rear and top designations being relative to the position of an operator using the apparatus. The length and width dimensions are such that the cabinet 10 supports a top plate 12 mounted thereon. The front, right side, left side and rear elevations of the cabinet 10 enclose and support the electrical and mechanical components of the apparatus. Enclosed within the cabinet 10 are a ribbon stock reel brake 20, an electrical motor 28 for pulling the new pre-inked ribbon 18 from the new pre-inked ribbon supply reel 16 on the ribbon stock reel assembly 14 past the idler 22 around the counting wheel 24 and stuffing said new pre-inked ribbon 18 into a ribbon cartridge 30, a main power fuse 88, an electrical motor power fuse 100 as well as the wiring necessary to interconnect the various electronic components of the apparatus.

The apparatus for stuffing a snailed endless new pre-inked ribbon 18 into a ribbon cartridge 30 has a top plate 12. The top plate 12 comprises a working surface of a length and a width commensurate with the length and width of the cabinet 10. The top plate 12 supports the ribbon stock reel assembly 14 on the top rear right side of the cabinet 10. The top plate 12 supports the idler 22 on the top rear right side of the cabinet 10 between the ribbon stock reel assembly 14 and the counting wheel 24. The top plate 12 supports the counting wheel 24 on the top rear center of the cabinet 10. The top plate 12 supports the universal jig 32 on the top at the middle center of the cabinet 10. The top plate 12 further supports a control panel 36 on an inclined face on the top front of the cabinet 10 between the universal jig 32 and the front elevation of the cabinet 10.

Figure 5:
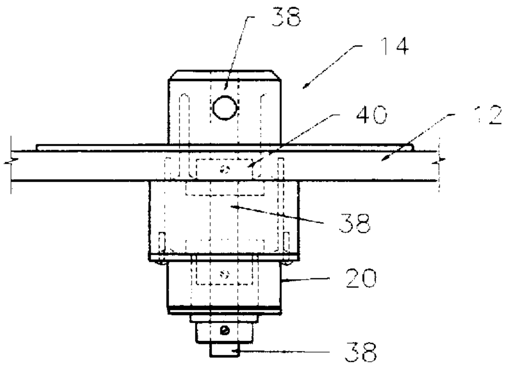
FIG. 5 is an enlarged side view of a ribbon stock reel assembly of an apparatus for stuffing a snailed endless pre-inked ribbon into a ribbon cartridge embodying the present invention.
Figure 6:
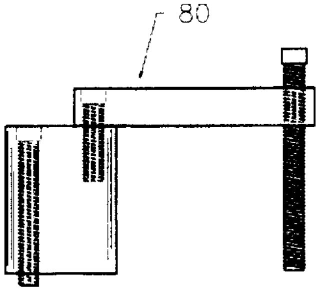
FIG. 6 is an enlarged side view of an over-the-top clamp securing means for securing a ribbon cartridge on the universal jig of an apparatus for stuffing a snailed endless pre-inked ribbon into a ribbon cartridge embodying the present invention.

As shown in FIG. 5, the apparatus for stuffing a snailed endless new pre-inked ribbon 18 into a ribbon cartridge 30 has a ribbon stock reel assembly 14. The ribbon stock reel assembly 14 comprises a spindle 38 which rotates on the top plate 12 and which supports a new pre-inked ribbon supply reel 16. The new pre-inked ribbon supply reel 16 rotates along with the spindle 38 when new pre-inked ribbon 18 is pulled therefrom. The spindle 38 extends through an opening in the top plate 12 and is supported on the top plate 12 by means of an adjustable collar 40 securing to the spindle 38 on the top plate 12 such that the spindle 38 and adjustable collar 40 are free to rotate within the opening through the top plate. The ribbon stock reel assembly 14 has a ribbon stock reel brake 20. The ribbon stock reel brake 20 is housed within the cabinet 10 and attaches to the spindle 38 of the ribbon stock reel assembly 14 within the cabinet 10. The ribbon stock reel brake 20 slows and stops the rotation of the spindle 38 of the ribbon stock reel assembly 14 and thus the attached new pre-inked ribbon supply reel 16. The ribbon stock reel brake 20 automatically stops the rotation of the spindle 38 of the ribbon stock reel assembly 14 and thus the attached new pre-inked ribbon supply reel 16 when a preset amount of ribbon has been pulled from the new pre-inked ribbon supply reel 16.

Figure 4:
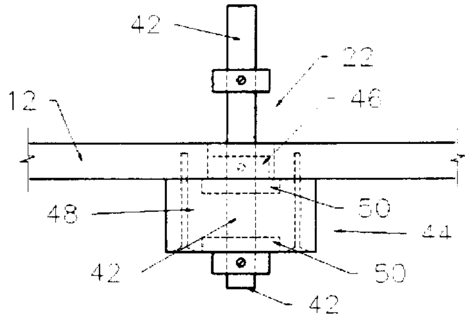
FIG. 4 is an enlarged side view of an idler of an apparatus for stuffing a snailed endless pre-inked ribbon into a ribbon cartridge embodying the present invention.

As shown in FIG. 4, the apparatus for stuffing a snailed endless new pre-inked ribbon 18 into a ribbon cartridge 30 has an idler 22. The idler 22 comprises an adjustable idler spindle 42 for providing tension on the new pre-inked ribbon 18 between the new pre-inked ribbon supply reel 16 on the ribbon stock reel assembly 14 and a counting wheel 24. The idler 22 is positioned on the top plate 12 such that the new pre-inked ribbon 18 exiting from the new pre-inked ribbon supply reel 16 on the ribbon stock reel assembly 14 has maximum ribbon interfacing with the counting wheel 24. The idler spindle extends through an opening in the top plate 12 and is supported in an idler bearing assembly 44 in the top plate 12 by an adjustable idler collar 4-6. The idler bearing assembly 44 comprises an idler bearing block 48 through which the adjustable idler spindle passes 42. The idler bearing block 48 has a plurality of two bearings 50 mounted respectively one on the top and one on the bottom therein. The idler spindle passes through each of the plurality of two bearings 50 mounted in the idler bearing assembly 44 and is supported thereon by the adjustable idler collar 46 such that the idler spindle freely rotates within the idler bearing assembly 44.

As shown in FIG. 3, the apparatus for stuffing a snailed endless new pre-inked ribbon 18 into a ribbon cartridge 30 has a counting wheel 24. The counting wheel 24 comprises a counting wheel spindle 52 which extends through an opening in the top plate 12 is supported in a counting wheel bearing assembly 58 in the top plate 12 by a counting wheel spindle collar 60. The counting wheel bearing assembly 58 comprises a counting wheel bearing block 62 through which the counting wheel spindle 52 passes. The counting wheel bearing block 62 has a plurality of two bearings 50 mounted respectively one on the top and one on the bottom therein. The counting wheel spindle 52 passes through each of the plurality of two bearings 50 mounted in the counting wheel bearing block 62 of the counting wheel bearing assembly 58 and is supported thereon by the counting wheel spindle collar 60 such that the counting wheel spindle 52 freely rotates within the counting wheel bearing block 62 of the counting wheel bearing assembly 58. The counting wheel spindle 52 supports a ribbon reel 64 mounted thereon, said ribbon reel 64 having a one foot face circumference upon which the new pre-inked ribbon 18 interfaces in the path between the new pre-inked ribbon supply reel 16 on the ribbon stock reel assembly 14 and the ribbon cartridge 30 being stuffed. The counting wheel 24 further comprises a sensing indicator 66 on the counting wheel 24 which sensing indicator 66 interacts with a proximity sensor 26 mounted on the cabinet 10 adjacent to the counting wheel 24 to provide electrical stimulus to a programmed counter 34 located on the control panel 36. As the ribbon reel 64 rotates by reason of the new pre-inked ribbon 18 being pulled from the new pre-inked ribbon supply reel 16 on the ribbon stock reel assembly 14, past the idler 22 and across the ribbon reel 64 face, the sensing indicator 66 on the counting wheel 24 passes the proximity sensor 26 and electrically signals another one foot increment of new pre-inked ribbon 18 being stuffed into the ribbon cartridge 30, which electrical signal is received by the programmed counter 34 on the control panel 36.

Figure 7:
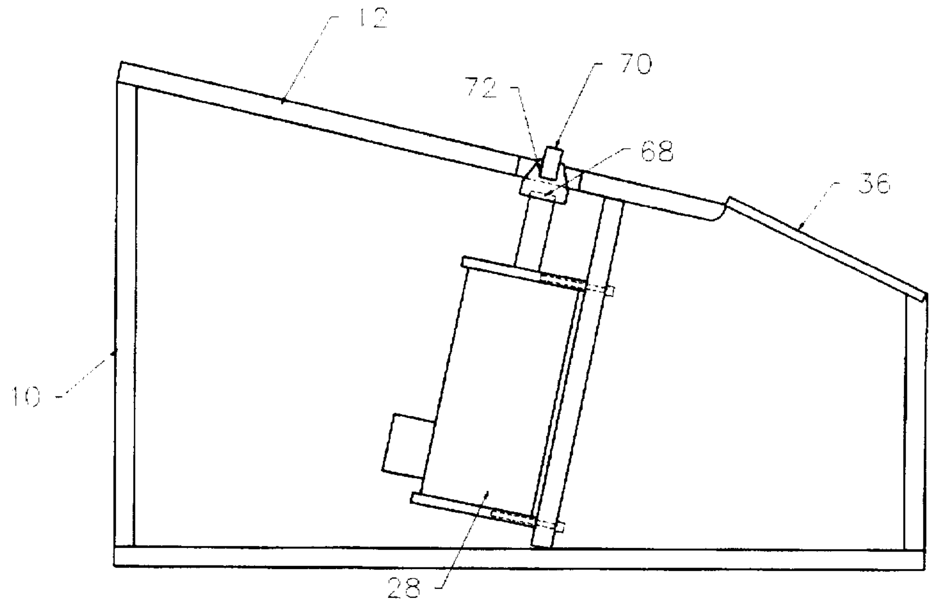
FIG. 7 is a cut-away side view of the cabinet showing an electrical motor having a hex drive of an apparatus for stuffing a snailed endless pre-inked ribbon into a ribbon cartridge embodying the present invention.

As shown in FIG. 7, the apparatus for stuffing a snailed endless new pre-inked ribbon 18 into a ribbon cartridge 30 has an electrical motor 28 for pulling the new pre-inked ribbon 18 from new pre-inked ribbon supply reel 16 on the ribbon stock reel assembly 14 past the idler 22 around the counting wheel 24 and stuffing the new pre-inked ribbon 18 into a ribbon cartridge 30. The electrical motor 28 is enclosed within the cabinet 10 and has a female driver 68 mounted on the electrical motor 28. The female driver 68 mounted on the electrical motor 28 supports a male hex driver 70, said male hex driver 70 being compatible with the gear of the ribbon cartridge 30 being stuffed. The electrical motor 28 is connected and regulated by an electrical motor control located on the control panel 36, which electrical motor control receives electrical power from a programmed counter 34. The electrical motor control includes an electrical motor off-on/speed control 94, an electrical motor power indicator 96, an electrical motor direction switch 98, an electrical motor power fuse 100, and electrical wiring interconnecting the various components. The motor comprises a direct current one-sixth horsepower motor 28 capable of either clockwise or counter-clockwise rotation as well as adjustable rotation speed. The female driver 68 mounted on the motor 28 comprises a female hex socket 72 which supports the male hex driver 70. The male hex driver 70 comprises a hex having a first end which is compatible with the female hex socket 72 of the female driver 68 mounted on the electrical motor 28 and a second end which is compatible with the gear of the reel drive of the ribbon cartridge 30 being stuffed.

Figure 8:
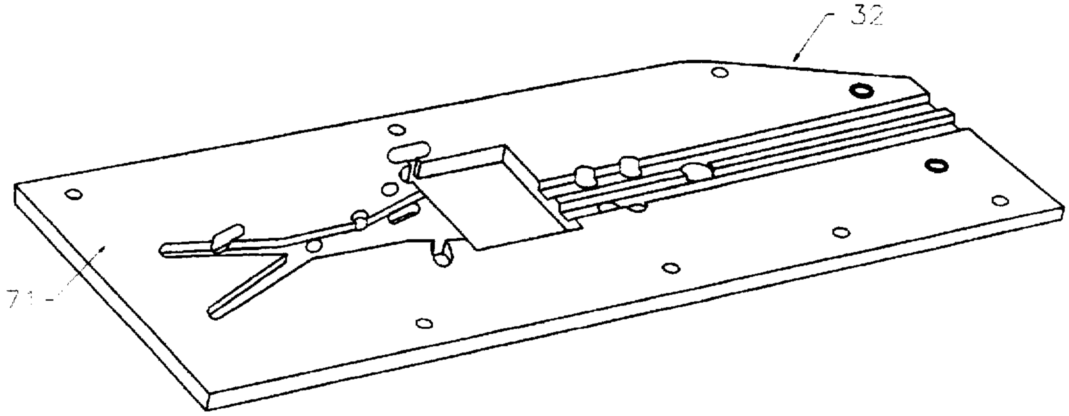
FIG. 8 is a perspective view of a universal jig of an apparatus for stuffing a snailed endless pre-inked ribbon into a ribbon cartridge embodying the present invention.

As shown in FIG. 8, the apparatus for stuffing a snailed endless new pre-inked ribbon 18 into a ribbon cartridge 30 has a universal jig 32. The universal jig 32 comprises a rectangular shaped plate 74 which is adjustably secured to the top plate 12 and has a cartridge securing means 76 for mounting and securing the ribbon cartridge 30 to be stuffed on the universal jig 32. The cartridge securing means 76 comprises a plurality of three adjustable slide brackets 78 against which the ribbon cartridge 30 is positioned on the universal jig 32 and an over-the-top clamp 80 for securing the ribbon cartridge 30 on the universal jig 32. The plurality of three adjustable slide brackets 78 are adjusted and positioned on the universal jig 32 to properly align the gear of the reel drive of the ribbon cartridge 30 being stuffed with the male hex driver 70. Proper alignment of the ribbon cartridge 30 on the universal jig 32 is accomplished by the gear of the reel drive of the ribbon cartridge 30 being stuffed being positioned over the male hex driver 70 so that when the male hex driver 70 is turned by the electrical motor 28 the gear of the reel drive of the ribbon cartridge 30 rotates and thus pulls the new pre-inked ribbon 18 from new pre-inked ribbon supply reel 16 of the ribbon stock reel assembly 14 past the idler 22 around the counting wheel 24 and stuffs said new pre-inked ribbon 18 into the ribbon cartridge 30. The plurality of three adjustable slide brackets 78 are positioned against the ribbon cartridge 30 on the universal jig 32 and secured to the universal jig 32 in such position. The over-the-top clamp 80, shown in FIG. 4, is also positioned on the top of the ribbon cartridge 30 on the universal jig 32 and tightened to the universal jig 32 in such position. The plurality of three adjustable slide brackets 78 prevent the ribbon cartridge 30 being stuffed from movement on the universal jig 32 and the over-the-top clamp 80 prevents the ribbon cartridge 30 being stuffed from movement away from the universal jig 32.

Figure 9:
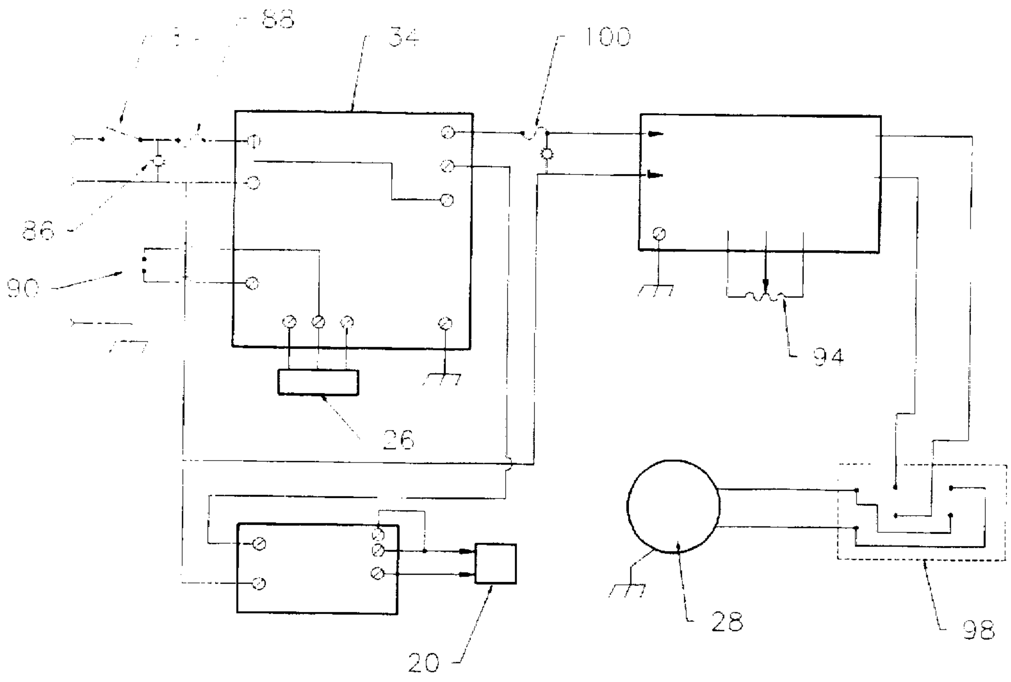
FIG. 9 is a diagram of the electronics of an apparatus for stuffing a snailed endless pre-inked ribbon into a ribbon cartridge embodying the present invention.

As shown in FIG. 9, electrical power, either 115 volts AC or 220 volts AC, is supplied to a main power switch 84. When the main power switch 84 is turned on, a main power indicator 86 activates and electrical power is supplied to a programmed counter 34. The programmed counter 34 in turn supplies electrical power by means of an internal relay to the electrical motor control. The programmed counter 34 is preset for the number of feet of new pre-inked ribbon 18 to be counted. The number of feet of new pre-inked ribbon 18 counted by the programmed counter 34 is provided by the sensing indicator 66 on the counting wheel 24 interacting with the proximity sensor 26 providing an electrical signal to the programmed counter 34. As the ribbon reel 64 rotates by reason of the new pre-inked ribbon 18 being pulled from the new pre-inked ribbon supply reel 16 on the ribbon stock reel assembly 14, past the idler 22 and across the ribbon reel 64 face, the sensing indicator 66 on the counting wheel 24 passes the proximity sensor 26 and electrically signals another one foot increment of new pre-inked ribbon 18 being stuffed into the ribbon cartridge 30, which electrical signal is received by the programmed counter 34 on the control panel 36.

To stuff a snailed endless new pre-inked ribbon 18 into a ribbon cartridge 30, the universal jig 32 is mounted on the top plate. The appropriate male hex driver 70 for the gear of the reel drive of the ribbon cartridge 30 to be stuffed is attached female driver 68 on the electrical motor 28. The ribbon cartridge 30 to be stuffed is mounted on the universal jig 32 and secured in place. The new pre-inked ribbon supply reel 16 with the appropriate new pre-inked ribbon 18 is mounted on the ribbon stock reel assembly 14 and the new pre-inked ribbon 18 is manually pulled therefrom and threaded past the idler 22 and around the counting wheel 24. The exposed continuous ribbon loop in the ribbon cartridge 30 to be stuffed is cut and the end that goes into the side of the ribbon cartridge 30 having the gear of the reel drive of the ribbon cartridge 30 to be stuffed is attached to the end of the new pre-inked ribbon 18 pulled from the new pre-inked ribbon supply reel 16. The ribbon from the ribbon cartridge 30 to be stuffed is manually pulled from the side of the ribbon cartridge 30 to be stuffed opposite the side of the ribbon cartridge 30 having the gear of the reel drive until all the ribbon is removed from the ribbon cartridge 30 to be stuffed except the short piece which is attached to the new pre-inked ribbon 18. The programmed counter 34 is manually preset to the proper length of new pre-inked ribbon 18 that is to be stuffed into the ribbon cartridge 30. The programmed counter 34 will remain as manually preset until such time as manually reset. The rotational direction of the electrical motor 28 is set as appropriate, either clockwise or counter-clockwise, for the ribbon cartridge 30 to be stuffed. The electrical motor off-on/speed control 94 is activated and the electrical motor 28 will start rotating the gear of the reel drive of the ribbon cartridge 30 to be stuffed, pulling the new pre-inked ribbon 18 from new pre-inked ribbon supply reel 16 of the ribbon stock reel assembly 14 past the idler 22 around the counting wheel 24 and stuffing new pre-inked ribbon 18 into the ribbon cartridge 30 to be stuffed. The remainder of the ribbon is pulled from the ribbon cartridge 30 to be stuffed until approximately one foot of new pre-inked ribbon 18 has been pulled out the side of the ribbon cartridge 30 to be stuffed opposite the side of the ribbon cartridge 30 having the gear of the reel drive. The attachment joint of new pre-inked ribbon 18 to spent ribbon in the ribbon cartridge 30 to be stuffed is cut. The apparatus for stuffing a snailed endless new pre-inked ribbon 18 into a ribbon cartridge 30 will stuff the pre-set length of new pre-inked ribbon 18 into the ribbon cartridge 30 to be stuffed and stop automatically when said pre-set length has been so stuffed into the ribbon cartridge 30 to be stuffed. The new pre-inked ribbon 18 is cut on the side of the ribbon cartridge 30 having the gear of the reel drive at the sensing indicator 66 on the counting wheel 24, leaving approximately one foot of new pre-inked ribbon 18 outside the ribbon cartridge 30 to be stuffed. The ribbon cartridge 30 to be stuffed with the new pre-inked ribbon 18 stuffed therein is now removed from the universal jig 32 and the ends of the new pre-inked ribbon 18 are attached to provide a continuous loop of new pre-inked ribbon 18 in the ribbon cartridge 30 to be stuffed. Another identical ribbon cartridge 30 to be stuffed is secured to the universal jig 32 and the process repeated with the exception that when the new pre-inked ribbon 18 is ready to be stuffed into the second ribbon cartridge 30 to be stuffed, the pre-set switch is activated and the correct length of new pre-inked ribbon 18 will automatically be stuffed therein. The entire process of stuffing a ribbon cartridge 30 with new pre-inked ribbon 18 takes approximately two minutes.

The foregoing description of the preferred embodiment of the invention are to be considered as illustrative and not as limiting. Various changes and departures may be made to the invention herein without departing from the spirit and scope thereof. Accordingly, it is not intended that the invention herein be limited to that specifically described in the specification or as illustrated in the drawings, but only as set forth in the claims. From the drawings and above-description, it is apparent that an apparatus for stuffing a snailed endless new pre-inked ribbon into a ribbon cartridge constructed in accordance with the invention herein provides desirable features and advantages. While the form of the invention herein described constitutes a preferred embodiment, it is to be understood that the apparatus for stuffing a snailed endless new pre-inked ribbon into a ribbon cartridge herein is capable of further modification, and this application is intended to cover any variations, uses, or adaption of the apparatus for stuffing a snailed endless new pre-inked ribbon into a ribbon cartridge herein, following in general the principles of the apparatus for stuffing a snailed endless new pre-inked ribbon into a ribbon cartridge herein and include such departures from the present disclosure as to come within knowledge or customary practice in the art to which the apparatus for stuffing a snailed endless new pre-inked ribbon into a ribbon cartridge herein pertains, and as may be applied to the essential features hereinbefore set forth and falling within the scope of the apparatus for stuffing a snailed endless new pre-inked ribbon into a ribbon cartridge herein or the limits of the appended claims.

What is claimed and desired to be secured by United States Letters Patent is:

1. An apparatus for stuffing a snailed endless new pre-inked ribbon into a ribbon cartridge comprising:

a cabinet having a length, a width, a front side with an elevation, a right side with an elevation, a left side with an elevation, a rear side with an elevation, and a top plate mounted thereon;

a top plate mounted on the cabinet, said top plate having a working surface of a length and a width commensurate with the length and width of the cabinet and supporting a ribbon stock reel assembly on the top rear right side of the cabinet, an idler on the top rear right side of the cabinet between the ribbon stock reel assembly and a counting wheel, a counting wheel on the top rear center of the cabinet, a universal jig on the top at the middle center of the cabinet, and a control panel on an inclined face on the top front of the cabinet between the universal jig and the front elevation of the cabinet;

a ribbon stock reel assembly mounted on the top plate for supporting a new pre-inked ribbon supply reel containing a length of new pre-inked ribbon, said ribbon stock assembly having a spindle which rotates on the top plate and which supports the new pre-inked ribbon supply reel;

a ribbon stock reel brake mounted in the cabinet and attached to the ribbon stock reel assembly;

an idler for providing tension on the new pre-inked ribbon between the new pre-inked ribbon supply reel on the ribbon stock reel assembly and a counting wheel, said idler having an adjustable idler spindle with an adjustable collar;

a counting wheel having a sensing indicator which interacts with a proximity sensor for counting a length of new pre-inked ribbon;

a proximity sensor which interacts with the sensing indicator of the counting wheel to produce an electrical signal which is received by a programmed counter;

an electrical motor having a hex drive for pulling the new pre-inked ribbon from the ribbon stock reel assembly past the idler around the counting wheel and stuffing said new pre-inked ribbon into a ribbon cartridge;

a universal jig having ribbon cartridge securing means for holding the ribbon cartridge to be stuffed mounted on said top plate;

a programmed counter; and, a control panel having a main power switch, main power indicator light, reset switch, motor speed control, motor power indicator light and motor direction switch, and a main power fuse and motor power fuse located in the cabinet along with the wiring necessary to interconnect the various electronic components.

2. The apparatus for stuffing a snailed endless new pre-inked ribbon into a ribbon cartridge recited in claim 1, wherein said ribbon stock reel assembly further comprises said spindle extending through an opening in the top plate and being supported on the top plate by means of an adjustable collar secured to the spindle on the top plate such that the spindle and collar are free to rotate within the opening through the top plate.

3. The apparatus for stuffing a snailed endless new pre-inked ribbon into a ribbon cartridge recited in claim 1, wherein said idler further comprises:

an idler positioned on the top plate such that the new pre-inked ribbon exiting from the new pre-inked ribbon supply reel on the ribbon stock reel assembly has maximum ribbon interfacing with the counting wheel;

an idler spindle extending through an opening in the top plate and being supported in an idler bearing assembly in the top plate by the adjustable idler collar;

said idler bearing assembly having an idler bearing block through which the idler spindle passes; and, said idler bearing block having a plurality of two bearings mounted respectively one on the top and one on the bottom of the idler bearing block such that the idler spindle passes through each of the plurality of two bearings and is supported on the idler bearing block by the adjustable idler collar such that the idler spindle freely rotates within the idler bearing assembly.

4. The apparatus for stuffing a snailed endless new pre-inked ribbon into a ribbon cartridge recited in claim 1, wherein said counting wheel having a sensing indicator which interacts with a proximity sensor for counting a length of new pre-inked ribbon further comprises:

a counting wheel spindle, said counting wheel spindle extending through an opening in the top plate and being supported in a counting wheel bearing assembly in the top plate by a counting wheel spindle collar attached to the counting wheel spindle;

said counting wheel bearing assembly having a counting wheel bearing block through which the counting wheel spindle passes;

said counting wheel bearing block having a plurality of two bearings mounted respectively one on the top and one on the bottom of said counting wheel bearing block;

said counting wheel spindle passing through each of the plurality of two bearings mounted in the counting wheel bearing block of the counting wheel bearing assembly and being supported on the counting wheel bearing block by the counting wheel spindle collar such that the counting wheel spindle freely rotates within the counting wheel bearing block of the counting wheel bearing assembly;

said counting wheel spindle having a ribbon reel mounted thereon;

said ribbon reel having a one foot ribbon reel face circumference upon which the new pre-inked ribbon interfaces in the path between the new pre-inked ribbon supply reel on the ribbon stock reel assembly and the ribbon cartridge being stuffed; and, said counting wheel further comprises a sensing indicator, said sensing indicator interacting with a proximity sensor to provide an electrical signal to a programmed counter such that as the ribbon reel rotates by reason of the new pre-inked ribbon being pulled from the new pre-inked ribbon supply reel on the ribbon stock reel assembly, past the idler and across the ribbon reel face, the sensing indicator passes the proximity sensor and electrically signals an increment of new pre-inked ribbon being stuffed into the ribbon cartridge.

5. The apparatus for stuffing a snailed endless new pre-inked ribbon into a ribbon cartridge recited in claim 1, wherein said electrical motor further comprises:

a female driver mounted on said electrical motor;

said female driver having a female hex socket for supporting a male hex driver;

said male hex driver being compatible with the female driver and a gear of the reel drive of the ribbon cartridge being stuffed;

said electrical motor having an electrical motor control, said electrical motor control being located on the control panel and receiving electrical power from the programmed counter;

said electrical motor control having an electrical motor off-on/speed control, an electrical motor power indicator, an electrical motor direction switch, an electrical motor power fuse, and electrical wiring interconnecting the various electronic components; and, said male hex driver having a first end which is compatible with the female hex socket of the female driver and a second end which is compatible with the gear of the reel drive of the ribbon cartridge being stuffed.

6. The apparatus for stuffing a snailed endless new pre-inked ribbon into a ribbon cartridge recited in claim 5, wherein said electrical motor further comprises a direct current one-sixth horsepower electrical motor capable of either clockwise or counter-clockwise rotation as well as adjustable rotation speed.

7. The apparatus for stuffing a snailed endless new pre-inked ribbon into a ribbon cartridge recited in claim 1, wherein said universal jig having ribbon cartridge securing means for holding the ribbon cartridge to be stuffed mounted on the top plate further comprises:

a rectangular shaped plate, said rectangular shaped plate being adjustably secured to said rod plate; and, said cartridge securing means for mounting and securing the ribbon cartridge to be stuffed on the universal jig being a plurality of three adjustable slide brackets against which the ribbon cartridge is positioned and an over-the-top clamp for securing the ribbon cartridge on the universal jig, said plurality of three adjustable slide brackets being adjusted and positioned on the universal jig to properly align the gear of the reel drive of the ribbon cartridge being stuffed with the male hex driver and said over-the-top clamp being positioned against the ribbon cartridge on the universal jig and tightened to the universal jig in such position.

* * * * *